United States Patent [19]
Wagner

[11] Patent Number: 5,365,724
[45] Date of Patent: Nov. 22, 1994

[54] ANTI-WRAP DEVICE FOR ROTATING SHAFT

[75] Inventor: James H. Wagner, Essex Junction, Vt.

[73] Assignee: Country Home Products, Inc., Charlotte, Vt.

[21] Appl. No.: 46,263

[22] Filed: Apr. 6, 1993

[51] Int. Cl.⁵ .................................... A01D 34/00
[52] U.S. Cl. ................................ 56/12.1; 56/12.7
[58] Field of Search ............... 56/12.1, 12.7, 17.5; 30/276

[56] References Cited

U.S. PATENT DOCUMENTS

| | | |
|---|---|---|
| 2,564,586 | 8/1951 | Smith et al. |
| 2,636,333 | 4/1953 | Michaels |
| 2,651,159 | 9/1953 | Rountree |
| 2,688,221 | 9/1954 | Giesbrecht |
| 2,787,108 | 4/1957 | Meltzer |
| 2,809,488 | 10/1957 | Sewell |
| 2,814,924 | 12/1957 | Group et al. |
| 3,000,165 | 9/1961 | Lill |
| 3,044,241 | 7/1962 | Snider |
| 3,104,509 | 9/1963 | Clendenin et al. |
| 3,522,693 | 8/1970 | Knapp |
| 3,890,773 | 6/1975 | Frost |
| 4,091,538 | 5/1978 | Akiyama ............ 56/12.7 X |
| 4,145,809 | 3/1979 | Proulx |
| 4,189,905 | 2/1980 | Frantello |
| 4,203,212 | 5/1980 | Proulx ............... 56/12.7 X |
| 4,292,789 | 10/1981 | Mathews |
| 4,581,879 | 4/1986 | Anstey |
| 5,095,688 | 3/1992 | Fabrizio ............. 56/12.7 |
| 5,174,100 | 12/1992 | Wassenberg ........ 56/12.1 X |

Primary Examiner—Michael Powell Buiz
Attorney, Agent, or Firm—Fay, Sharpe, Beall, Fagan, Minnich & McKee

[57] ABSTRACT

A device that prevents wrapping of long strands of fibrous material around an exposed rotating shaft has a stationary flange fixed to the chassis or bearing housing for the shaft and a rotating flange fixed to the shaft. The flanges are positioned to pass one another during each revolution of the shaft. When the flanges are nearest to one another, a loop of vegetation forms tightly around the flanges. Continued rotation of the shaft then stretches and tears the loop apart. This loop forming and tearing is repeated for each revolution of the shaft to effectively prevent fibrous material from wrapping around the shaft.

10 Claims, 3 Drawing Sheets

ANTI-WRAP DEVICE FOR ROTATING SHAFT

BACKGROUND OF THE INVENTION

1. Field of the Invention

The invention relates to a device that prevents long strands of vegetation and fibrous material, including grass, from wrapping around an exposed rotating shaft of a machine. In particular, the device is useful for preventing the shaft of a cutting head or bailing roll from being wrapped with fibrous material during use.

2. Background of the Invention

Cutters and other machines having rotating shafts, such as bailers, frequently experience wrapping problems wherein the grass, vegetation or other fibrous matter being worked on wraps around the rotating shaft. If a sufficient amount of wrapping occurs, it impedes rotation of the shaft, and causes an additional strain to be placed on the engine and shaft bearings. The wrapping problem is particularly prevalent when a rotating shaft is exposed to long vegetation, such as field brush, vines, grass and hay, for example.

Conventional lawn mowers having steel blades do not encounter a wrapping problem when the grass being cut is relatively short. Lawn mowers are able to cut the grass strands more than just once and expel the clippings from the housing with a strong blowing force created by the rotation of the blades. This cutting action, which produces short pieces of grass in combination with the blowing of the clippings out of the housing prevents most of the grass from wrapping around the shaft. When steel blade mowers are used to cut tall grass, however, a wrapping problem can be experienced. One method for coping with this problem is to provide a shaft having primary and secondary cutting elements. The primary cutting elements are typically steel blades such as those found on a conventional lawn mower and the secondary cutting elements are typically short steel blades positioned vertically above the primary blades for cutting any clippings that reach the shaft above the primary cutting blade. Once all of the vegetation is cut to a sufficiently short length, it cannot wrap around the shaft.

The wrapping problem in general, has been recognized, and several attempts have been made to avoid the problem. One such attempt is to prevent the rotating shaft of a machine part from being exposed to the material being cut, bailed or transported, etc. To accomplish this, a shroud or seal is provided between the rotating shaft and the bearing housing. This is intended to prevent the shaft from being exposed. Despite such attempts, however, the best function that a shroud can perform is to minimize the exposure of the area of the shaft that is in contact with the stationary bearing housing. Thus, even when a shroud is used to prevent wrapping, long strands of fibrous material are built up on the stationary part so that eventually other strands are able to become wrapped around the rotating shaft by working around the shroud.

Another problem with using shrouds results from a fibrous material pulverizing action that takes place between the rotating and stationary parts of the shroud arrangement. This occurs because even with the most elaborate shroud design, there is some exposure to the fibrous material being cut, bailed, transported, etc. As this fibrous material is pulverized, the pieces can work their way into the bearing housing and cause overheating of the bearings. Thus, although the shroud may be effective to prevent a conventional wrapping problem, the bearings are not protected from the secondary effects caused by the minimal amount of wrapping that still manages to take place. Accordingly, the bearings eventually need to be replaced in any event.

The wrapping problem addressed by the present invention exists with all types of machines that work in an environment where there is exposure to long strands of fibrous material, such as grasses, vines and brush. The problem is present with mowers, trimmers, bush hogs and even harvesters and bailers since each of these machines has a rotating shaft that comes into contact with long strands of fibrous material during their operation. The wrapping problem is not dependent on the orientation of the axis of the shaft. The shaft axis can extend vertically, horizontally or in any direction therebetween, and the wrapping problem still exists if the environment in which the machine is working is exposed to long strands of fibrous material.

SUMMARY OF THE INVENTION

It is an object of the invention to provide an anti-wrap device for a rotating shaft of a machine that is intended to be used in an environment wherein the rotating shaft is exposed to long blades of grass, long vines, long strands of vegetation and other types of long strands of fibrous material, typically encountered when cutting a field of brush or grass, and in harvesting and bailing operations.

It is an object of the invention to provide an anti-wrap device equally useful for a machine for cutting long strands of vegetation, such as tall grass or long vines and for machines intended to work in fields of out grass, such as hay bailers, as well as machines designed to clear thick brush, such as field and brush mowers and bush hogs. For each of these machines, a rotating shaft is required that is exposed to long lengths of the material being processed, whether the material is being cut, harvested, gathered, bailed or merely transported.

It is a further object of the invention to provide an anti-wrap device for a cutting machine that is exposed during its operation to long strands of fibrous material, such as grass, and that has steel blades or nylon cords for cutting the fibrous material. In particular, the anti-wrap device of the present invention is useful for string trimmer/mowers having cords for cutting vegetation as well as bush hogs or field and brush mowers having heavy metal blades for cutting brush and other types of vegetation.

DETAILED DESCRIPTION OF THE PREFERRED EMBODIMENTS

The anti-wrap device of the present invention is intended to be suitable for use with any machine having a rotating shaft that is journalled for rotation in a bearing housing. The embodiments of the anti-wrap device of the present invention disclosed herein are not intended to be examples that limit the application of the device to cutting machines. The device of the present invention is also well suited for application to harvester and bailers that work in environments wherein they are exposed to long strands of fibrous material.

Figure 1:
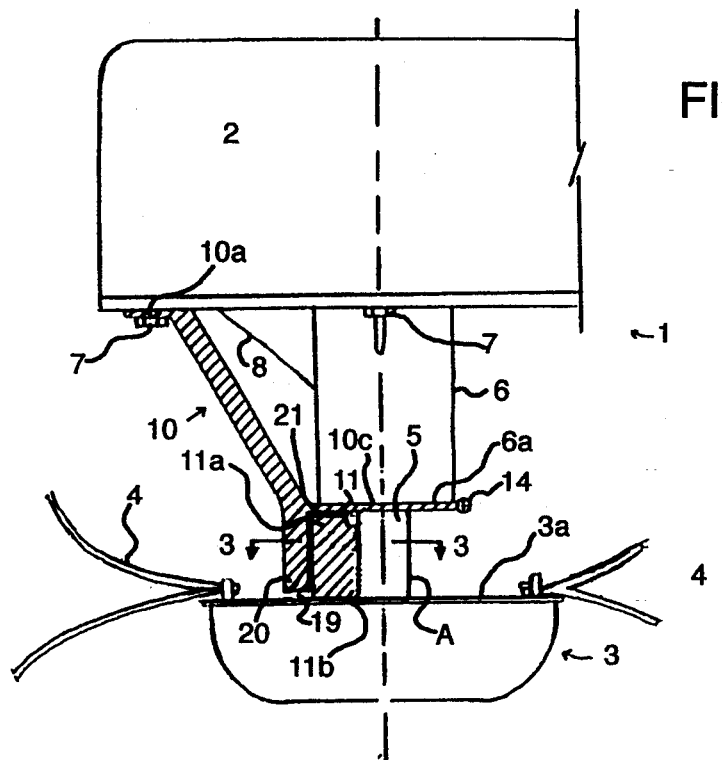
FIG. 1 is a side view of the anti-wrap device of the present invention mounted on a string trimmer/mower.
Figure 2:
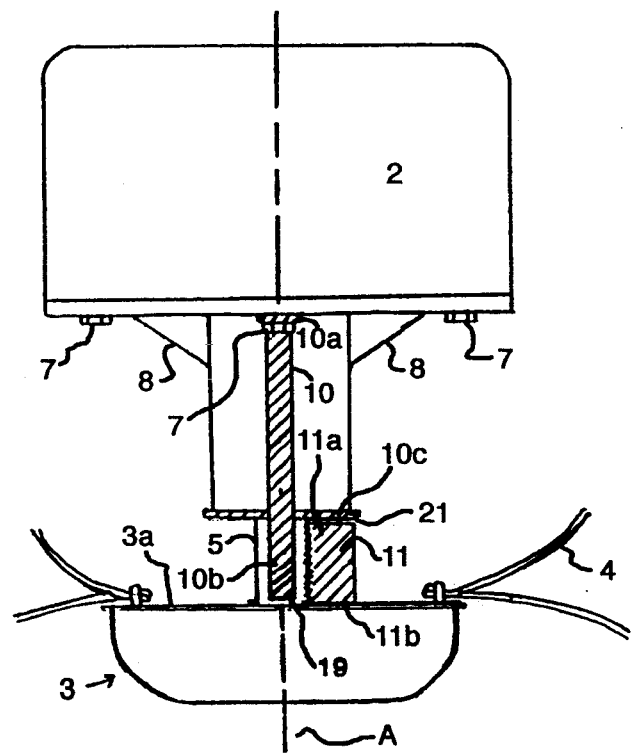
FIG. 2 is a front view of the anti-wrap device shown in FIG. 1.

One example of a cutting machine to which the present invention can be applied is shown in FIGS. 1 and 2. These figures show a string trimmer/mower, the details of which are known from U.S. Pat. No. 4,703,613, and the disclosure of which is herein incorporated by reference. The trimmer 1 has a chassis 2 and a cutting head 3. Cords 4, which are secured to rotate with the cutting head, perform the cutting action in a well known manner.

A motor, not shown, drives a shaft 5 about an axis of rotation A through a belt drive, for example. The shaft is journalled in a cylindrical bearing housing 6 and cutting head 3 is fixed to the distal end of the shaft 5. Preferably, bearing housing 6 is fabricated in one piece with reinforcing flanges 8 and bolted to the chassis 2 by bolts 7.

The embodiment of the anti-wrap device of the present invention shown in FIG. 1 has a stationary arm 10 which is bolted at one end 10a to the chassis, preferably by one of the bolts 7 used to secure the bearing housing to the chassis. At the other end of arm 10 is a fixed flange 10b that extends downwardly a distance sufficient to just clear the top mounting disk 3a of cutting head 3 with a clearance 19. A third portion 10c of the stationary arm encircles the cylindrical bearing housing and can be tightened around the housing by a screw 14 or fixed to the bearing housing in a conventional manner. As an alternative construction, arm 10 can be fabricated in one piece with the bearing housing during manufacture of the trimmer/mower.

The anti-wrap device of FIG. 1 also includes a rotating flange 11 which is fixed to the shaft 5 for rotation therewith by welding, for example. Rotating flange 11 acts as a cutter as it passes by fixed flange 10b with a narrow clearance 20 of preferably 1/32"-⅛". The rotating flange also has a gap 21 at its top edge 11a with respect to the bottom edge 6a of the bearing housing. Bottom edge 11b, on the other hand, directly contacts the mounting disc 3a of the cutting head. Preferably, top mounting disc 3a is made of metal and the rotating flange 11 is welded directly onto the metal disc along its bottom edge 11b.

The close clearance 20 between the fixed and rotating flanges 10b, 11 as well as the close clearance 21 between the top edge 11a of the rotating flange and the bottom 6a of the bearing housing ensures that grass or vegetation is not likely to wrap around the shaft 5 without also being wrapped around the fixed flange 10b. If grass or vegetation begins to wrap around only the shaft 5, the grass is clipped or cut between the fixed and rotating edges of the respective flanges 10b and 11. This is one function performed by the anti-wrap device of the present invention, and it effectively reduces the extent to which grass or vines wraps around shaft 5. However, grass and other vegetation also has a tendency to wrap around shaft 5 and stationary flange 10b together, particularly when long lengths of vegetation are being cut or swept by the blowing force generated from the rotating strings.

Figure 3:
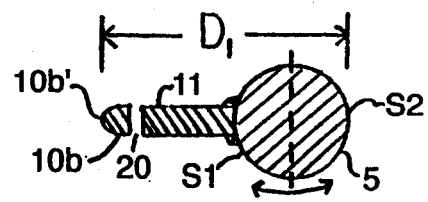
FIG. 3 is a partial sectional view of the anti-wrap device of FIG. 1, taken along lines 3—3.
Figure 4:
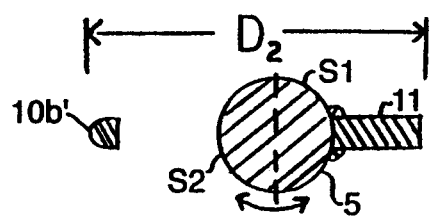
FIG. 4 is a partial sectional view similar to FIG. 3, but showing the rotating shaft being rotated an additional 180° with respect to the position shown in FIG. 3.

With reference to FIGS. 3 and 4, cut vegetation attempts to wrap the full way around shaft 5 and fixed flange 10b, which are shown in cross section. When the rotating flange 11 is in the position shown in FIG. 3, the vegetation wraps tightly around these structures to form a loop. As the rotating flange 11 rotates and additional 180°, to the position shown in FIG. 4, the separation distance $D_2$ between the outer periphery $10b'$ of the fixed flange 10b and the rotating flange 11 greatly exceeds that of separation distance $D_1$ shown in FIG. 3. Thus, the loop of vegetation formed when the rotating flange 11 was in the position shown in FIG. 3 is stretched and torn apart. The formation of the tight loop of grass or vegetation around the structures positioned as shown in FIG. 3 is repeated for each revolution of the shaft and followed immediately by the stretching and tearing of the loop by rotation of the flange 11 to the position shown in FIG. 4. This causes the vegetation to be torn into pieces having lengths small enough that they do not present any further wrapping problem. This is a second function performed by the anti-wrap device of the present invention. Accordingly, wrapping of grass around the shaft 5, as well as around the combination of the shaft 5 and fixed flange 10b is prevented by the anti-wrap device of the present invention.

Although the second anti-wrap function of the invention is explained with reference to the device being mounted on a string trimmer/mower, as shown in FIGS. 3 and 4, these sectional views illustrate the way in which this second function can be accomplished for any application of the anti-wrap device of the present invention to a rotating shaft journalled for rotation in a bearing housing. To accomplish the second anti-wrap function in general, it is significant that the rotating flange extends outwardly from only one side S1 of the shaft, as shown in FIGS. 3 and 4. If additional rotating flanges are added to the other side S2 of the shaft, particularly in a position diametrically opposite to the position of the rotating flange as shown in FIG. 3, the second anti-wrap function becomes less efficient. When an additional flange is added, there is less of a tendency to form a tight loop of grass that is then torn apart into smaller pieces. Of course, this action takes place to a certain extent, but the use of only one rotating flange magnifies this effect and therefore provides good reliability in preventing the wrapping of vegetation around the combination of the shaft and fixed flange mounted on the bearing housing or chassis of the machine 10b.

Modifications of the anti-wrap device are possible, and only a preferred embodiment of the device is shown in the figures. For example, the fixed flange is shown to be half-round in cross section, but it could be square, triangular or circular in cross section. Furthermore, only one rotating flange is disclosed, but two or possibly more flanges could be welded onto the periphery of the shaft, provided that all of the flanges are fixed to only one side of the shaft, i.e. all positioned along a continuous arc of the circumference of the shaft of less than 180°.

Also, the rotating flange is disclosed to be a piece of plate metal that is relatively thin in comparison to the diameter of the shaft, but its thickness and weight can be adjusted in accordance with practical considerations. One such consideration is that the fixed and rotating flanges must have sufficient strength to cut through thick, tough strands of vegetation and grass. Another such consideration is that the rotating flange cannot weigh so much or extend so far away from the center of rotation of the shaft so as to cause eccentricity in its rotation.

The anti-wrap device is disclosed as being an add-on or separately manufactured device that is welded or otherwise secured to an existing cutting machine, such as a trimmer/mower. Alternatively, the stationary arm of the device can be fabricated in one piece with the remainder of the bearing housing. Further, the rotating flange can be fabricated as part of the original shaft that is used in manufacturing the mower/trimmer.

Figure 5:
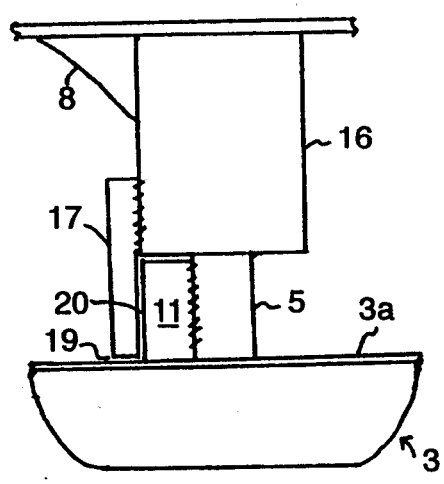
FIG. 5 is a side view of an anti-wrap device constructed according to the present invention and modified with respect to the embodiment of the device shown in FIG. 1 for mounting on a string trimmer/mower.

FIG. 5 shows a modified bearing housing construction for a string mower/trimmer like that shown in FIGS. 1 and 2, wherein the bearing housing 16 has a stationary flange 17 fixed to it by welding, for example. Thus, the anti-wrap device shown in FIG. 5 differs from the one shown in FIG. 1 in that the fixed flange portion of the device is fixed to the bearing housing directly without a supporting arm portion 10a. In some applications, the use of the supporting arm 10a is convenient since it provides strength in the support of the fixed flange without requiring a welding step. In other applications, the welding step can be performed efficiently without the need for fabricating the supporting arm.

Figure 6:
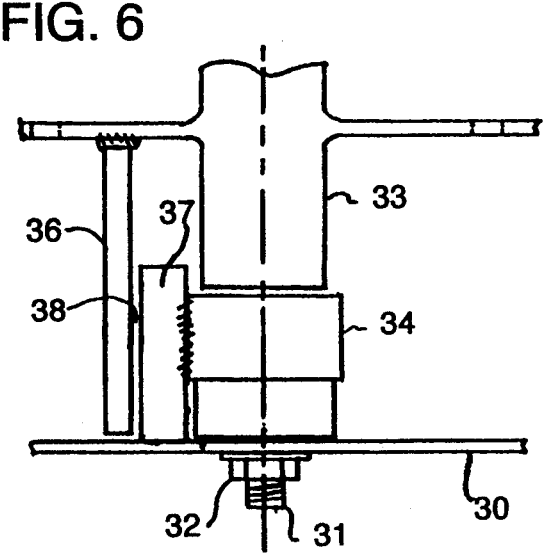
FIG. 6 is a side view of an anti-wrap device constructed according to the present invention and modified to be mounted on a field and brush mower.

FIG. 6 shows a side view of an anti-wrap device constructed according to the present invention and modified to be mounted on a field and brush mower having a steel blade. Although steel blade cutting machines are less likely to encounter a wrapping problem, as compared with string trimmer/mowers, a potential wrapping problem exists since the machine is typically operated in an environment wherein long strands of fibrous material, such as grasses and vines exist.

As shown in FIG. 6, the field and brush mower has a blade 30 fixed to a rotating shaft 31 by a blade nut 32. Shaft 31 is journalled for rotation in bearing housing 33. The shaft has a protective collar 34 that is fixed for rotation with the shaft, and that is intended to prevent wrapping of fibrous material around the shaft. Although the collar itself is able to perform an anti-wrapping function by blocking or preventing the shaft from being exposed to long strands of fibrous material, there is still a point between the stationary bearing housing and the collar that is subjected to a wrapping problem.

The embodiment of the anti-wrap device of the invention shown in FIG. 6 has a stationary vertical arm 36 that is welded to the chassis of the mower, not shown. Alternatively, vertical arm 36 can be fixed to the bearing housing or chassis by using the bolts, not shown, that secure the bearing housing to the chassis of the mower. Mounted on one side of the rotating collar is a rotating flange 37 that passes within close proximity to the vertical arm, forming a narrow clearance 38 therebetween of preferably 1/32" to ⅛". The rotating flange 38 extends above the top of collar 34 at one end and engages the blade at its other end. The functions performed by the anti-wrap device shown in FIG. 6 are the same as those discussed with respect to the anti-wrap device shown in FIGS. 1 and 2.

Other modifications are possible in view of the foregoing disclosure, and the invention is defined by the appended claims.

What is claimed is:

1. An anti-wrap device for a rotating shaft of an apparatus having a chassis, said shaft being journalled for rotation in a bearing housing fixed to said chassis, and said shaft being driven in rotation, comprising:
   a stationary flange fixed to one of the chassis and the bearing housing and extending adjacent to an area of contact between the rotating shaft and the bearing housing; and
   a single rotating flange fixed for rotation with the shaft and being disposed to pass in close proximity to said fixed flange during each revolution of the shaft.

2. An anti-wrap device for an apparatus having a cutting head fixed to a shaft journalled for rotation in a bearing housing, the bearing housing being fixed to a chassis of the apparatus and the shaft being driven in rotation for rotating the cutting head, comprising:
   a first flange fixed to one of said housing and said chassis and a single second flange fixed for rotation with said shaft, said second flange being positioned to pass in close proximity to said first flange with a clearance therebetween sufficient to cut material caught between said flanges during rotation of the shaft.

3. An anti-wrap device for an apparatus having a cutting head fixed to a shaft journalled for rotation in a bearing housing, the bearing housing being fixed to a chassis of the apparatus and the shaft being driven in rotation for rotating the cutting head, comprising:
   a first flange fixed to one of said housing and said chassis and a second flange fixed for rotation with said shaft, said second flange being disposed to pass in close proximity to said first flange with a clearance therebetween sufficient to cut material caught between said flanges during rotation of the shaft; and
   an outermost terminal end of said first flange being separated by a first predetermined distance from an outermost terminal end of said second flange at a first position of said shaft wherein said flanges are directly adjacent one another, and the terminal end of said first flange being separated by a second predetermined distance from the terminal end of said second flange at a second position of said shaft separated 180° in rotation from said first position, whereby vegetation wrapped in a tight loop around the first and second flanges in said first position is expanded by further rotation of the second flange to the second position for tearing the wrapped vegetation loop apart.

4. An anti-wrap device according to claim 3, wherein said bearing housing is cylindrical and said first flange has an annular ring portion encircling said bearing housing.

5. An anti-wrap device according to claim 3, wherein said first flange is fixed to said bearing housing and to said chassis by an upwardly extending arm portion bolted to said chassis at one end thereof.

6. An anti-wrap device according to claim 2, wherein said clearance is between 1/32" to ⅛".

7. An anti-wrap device according to claim 3, wherein said clearance is between 1/32" to ⅛".

8. An anti-wrap device according to claim 3, wherein said second flange is fixed to said shaft on only one side thereof.

9. An anti-wrap device according to claim 3, wherein said second flange has a top edge that clears said bearing housing and a bottom edge that is fixed to said cutting head.

10. An anti-wrap device according to claim 2, wherein said first flange extends a distance downwardly sufficient to ensure a clearance between a terminal and portion of said flange and a top surface of said cutting head.

* * * * *